(12) United States Patent
Yuan

(10) Patent No.: US 10,783,249 B2
(45) Date of Patent: *Sep. 22, 2020

(54) ROOT VIRUS REMOVAL METHOD AND APPARATUS, AND ELECTRONIC DEVICE

(71) Applicant: Beijing Kingsoft Internet Security Software Co., Ltd., Beijing (CN)

(72) Inventor: Guoqing Yuan, Beijing (CN)

(73) Assignee: Beijing Kingsoft Internet Security Software Co., Ltd. (CN)

( * ) Notice: Subject to any disclaimer, the term of this patent is extended or adjusted under 35 U.S.C. 154(b) by 197 days.

This patent is subject to a terminal disclaimer.

(21) Appl. No.: 16/063,685

(22) PCT Filed: Dec. 26, 2016

(86) PCT No.: PCT/CN2016/112044
§ 371 (c)(1),
(2) Date: Jun. 18, 2018

(87) PCT Pub. No.: WO2017/114344
PCT Pub. Date: Jul. 6, 2017

(65) Prior Publication Data
US 2019/0266329 A1 Aug. 29, 2019

(30) Foreign Application Priority Data
Dec. 31, 2015 (CN) .......................... 2015 1 1030949

(51) Int. Cl.
*G06F 21/56* (2013.01)
(52) U.S. Cl.
CPC ............ *G06F 21/568* (2013.01); *G06F 21/56* (2013.01); *G06F 21/564* (2013.01); *G06F 2221/034* (2013.01)

(58) Field of Classification Search
CPC ...... G06F 21/568; G06F 21/56; G06F 21/561; G06F 21/564; G06F 21/577; G06F 21/50; G06F 21/51; G06F 221/034
See application file for complete search history.

(56) References Cited

U.S. PATENT DOCUMENTS 8,701,195 B2 * 4/2014 Man ..................... G06F 21/568
726/24
2007/0079178 A1 4/2007 Gassoway
(Continued)

FOREIGN PATENT DOCUMENTS

CN 102694801 A 9/2012
CN 102799801 A 11/2012
(Continued)

*Primary Examiner* — Kristine L Kincaid
*Assistant Examiner* — Shaqueal D Wade
(74) *Attorney, Agent, or Firm* — McDonnell Boehnen Hulbert & Berghoff LLP

(57) ABSTRACT

Embodiments of the present application provide a method and apparatus for removing a root-privileged virus and an electronic device. The method includes: scanning the smart device to find a root-privileged virus file; obtaining a root-privileged removing process according to the virus file; and removing the root-privileged virus file according to a preset removing strategy by using the root-privileged removing process. As a root-privileged process is directly obtained in this embodiment by using a found virus file, the smart device can obtain the root privileges more quickly, improving the speed of killing the root-privileged virus.

17 Claims, 3 Drawing Sheets

(56) References Cited

U.S. PATENT DOCUMENTS

| | | | |
|---|---|---|---|
| 2009/0319597 A1* | 12/2009 | Stucki | G06F 11/3006 |
| | | | 709/202 |
| 2011/0047618 A1 | 2/2011 | Evans et al. | |
| 2012/0304298 A1 | 11/2012 | Man et al. | |
| 2014/0020109 A1 | 1/2014 | Mraz et al. | |
| 2015/0150130 A1* | 5/2015 | Fiala | G06F 21/56 |
| | | | 726/23 |
| 2015/0264062 A1* | 9/2015 | Hagiwara | H04L 63/145 |
| | | | 726/24 |
| 2017/0316206 A1* | 11/2017 | Zou | G06F 11/34 |

FOREIGN PATENT DOCUMENTS

| | | | | |
|---|---|---|---|---|
| CN | 104008340 A | | 8/2014 | |
| CN | 104376256 A | | 2/2015 | |
| CN | 104424403 A | | 3/2015 | |
| CN | 104809403 A | | 7/2015 | |
| CN | 105095764 A | | 11/2015 | |
| CN | 102663286 A | | 9/2019 | |
| WO | PCT/CN2015/082604 | * | 6/2015 | G06F 11/34 |

\* cited by examiner

ROOT VIRUS REMOVAL METHOD AND APPARATUS, AND ELECTRONIC DEVICE

The present application is a US national phase under 35 U.S.C. § 371 of international application PCT/CN2016/112044, filed Dec. 26, 2016, which claims priority to Chinese patent application No. 201511030949.7, filed with the State Intellectual Property Office of the People's Republic of China on Dec. 31, 2015 and entitled "ROOT VIRUS REMOVAL METHOD AND APPARATUS, AND ELECTRONIC DEVICE", which are incorporated herein by reference in their entirety.

TECHNICAL FIELD

The application relates to the field of system security, and in particular to a method, and apparatus for removing root-privileged virus, and an electronic device.

BACKGROUND

In Unix systems and UNIX-like systems (e.g., Linux systems, and iOS systems), there are superusers who have super-user privileges (i.e., root privileges). The superusers have all rights in the system, such as starting or terminating a process, deleting or adding a user, mounting or disabling hardware. As viruses evolve, viruses having root privileges have come into existence. Such root-privileged viruses cannot be killed by a user who has no root privileges of the system.

In the prior art, to kill a root-privileged virus, a smart device may first check if root privileges of the system can be directly obtained, and if so, the device obtains the root privileges. In practice, there may be root-privileged processes in the system. In this case, the root privileges is obtained if a process with root privileges has been obtained.

If the root privileges of the system cannot be directly obtained, the smart device may look for potential vulnerabilities in the system, search the Internet for a solution for obtaining root privileges with respect to the vulnerabilities, download and perform the solution to obtain the root privileges, and then kill and remove the root-privileged virus using the obtained root privileges. Therefore, in the case where the root privileges of the system cannot be directly obtained, the smart device has to traverse various possible system vulnerabilities in an attempt to find a corresponding solution for obtaining root privileges. As a result, it may take longer to obtain the root privileges of the system, and thus more time would be required to kill the root-privileged virus.

SUMMARY

Embodiments of the present application are directed to a method and apparatus for removing a root-privileged virus, and an electronic device, by which root privileges can be obtained more quickly, and improve the speed of killing root-privileged viruses.

For this purpose, a method for removing a root-privileged virus is provided by an embodiment of the present application. The method is applicable to a smart device, and includes:

scanning the smart device to find a root-privileged virus file;

obtaining a root-privileged removing process according to the virus file; and removing the root-privileged virus file according to a preset removing strategy by using the root-privileged removing process.

Preferably, scanning the smart device to find a root-privileged virus file includes:

obtaining storage path information of the root-privileged virus file from a preset virus database; and finding the root-privileged virus file in the smart device according to the obtained storage path information of the virus file.

Preferably, obtaining a root-privileged removing process according to the virus file includes:

if the virus file is an executable file that records an approach of obtaining root privileges, executing the virus file to obtain the approach and obtaining the root-privileged removing process according to the approach;

if the virus file is a Switch Superuser file, executing the Switch Superuser file to obtain the root-privileged removing process.

Preferably, executing the virus file to obtain the approach and obtaining the root-privileged removing process according to the approach includes:

executing the virus file to obtain an intrusion process, such that the intrusion process can automatically trigger a system vulnerability corresponding to the root-privileged virus, and setting the process user identity of the intrusion process in the system kernel to zero by exploiting the system vulnerability to obtain the root-privileged removing process;

executing the Switch Superuser file to obtain the root-privileged removing process includes:

executing the virus file to create a root-privileged Switch Superuser process, such that a user using the smart device has the same root privileges as those of the root-privileged virus.

Preferably, removing the root-privileged virus file according to a preset removing strategy includes:

traversing the files in the smart device to determine all the files having the characteristics of the root-privileged virus according to the characteristics of the root-privileged virus stored in a preset database;

terminating all the processes corresponding to all the determined files having the characteristics of the root-privileged virus;

recovering startup items of the system to the status before the intrusion of the root-privileged virus; and deleting all the determined files having the characteristics of the root-privileged virus.

Preferably, terminating all the processes corresponding to all the determined files having the characteristics of the root-privileged virus includes:

determining a process identity corresponding to each of the determined files having the characteristics of the root-privileged virus based on the filename of the file having the characteristics of the root-privileged virus;

calling a process terminating command to terminate the process corresponding to the process identity.

Preferably, recovering startup items of the system to the status before the intrusion of the root-privileged virus includes:

determining storage paths of all the files having the characteristics of the root-privileged virus; searching an installation recovery list of the system to determine whether the list contains storage path information of the files having the characteristics of the root-privileged virus; and if so, calling a preset path deleting command to delete the storage path information of the files having the characteristics of the root-privileged virus from the installation recovery list, or determining whether there is a file having the characteristics of the root-privileged virus in the executable files that are executed by default when the system is started, deleting the file if there is such a file, and recovering the original file corresponding to the deleted file.

Preferably, deleting all the determined files having the characteristics of the root-privileged virus includes:

searching the attribute information list of a file having the characteristics of the root-privileged virus for attribute information denoting that the file is undeletable, and deleting the attribute information; and calling a file deleting command to delete the file having the characteristics of the root-privileged virus.

Preferably, the method further includes:

terminating the root-privileged removing process.

An apparatus for removing a root-privileged virus is provided in another embodiment of the present application. The apparatus is applicable to a smart device, and includes:

a scanning module configured to scan the smart device to find a root-privileged virus file;

a removing process obtaining module configured to obtain a root-privileged removing process according to the virus file; and a virus removing module configured to remove the root-privileged virus file according to a preset removing strategy by using the root-privileged removing process.

Preferably, the scanning module includes:

a path obtaining submodule configured to obtain storage path information of the root-privileged virus file from a preset virus database; and a virus finding submodule configured to find the root-privileged virus file in the smart device according to the obtained storage path information of the virus file.

Preferably, the removing process obtaining module is further configured to:

execute, if the virus file is an executable file that records an approach of obtaining root privileges, the virus file to obtain the approach, and to obtain the root-privileged removing process according to the approach;

execute, if the virus file is a Switch Superuser file, the Switch Superuser file to obtain the root-privileged removing process.

Preferably, the removing process obtaining module is further configured to:

execute the virus file to obtain an intrusion process, such that the intrusion process can automatically trigger a system vulnerability corresponding to the root-privileged virus, and set the process user identity of the intrusion process in the system kernel to zero by exploiting the system vulnerability to obtain the root-privileged removing process; or execute the virus file to create a root-privileged Switch Superuser process, such that a user using the smart device has the same root privileges as those of the root-privileged virus.

Preferably, the virus removing module includes:

a virus determining submodule configured to traverse the files in the smart device to determine all the files having the characteristics of the root-privileged virus according to the characteristics of the root-privileged virus stored in a preset database;

a process terminating submodule configured to terminate all the processes corresponding to all the determined files having the characteristics of the root-privileged virus;

a startup items recovery submodule configured to recover startup items of the system to the status before the intrusion of the root-privileged virus; and a file deleting submodule configured to delete all the determined files having the characteristics of the root-privileged virus.

Preferably, the process terminating submodule is further configured to:

determine a process identity corresponding to each of the determined files having the characteristics of the root-privileged virus based on the filename of the file having the characteristics of the root-privileged virus; and call a process terminating command to terminate the process corresponding to the process identity.

Preferably, the startup items recovery submodule is further configured to:

determine storage paths of all the files having the characteristics of the root-privileged virus; search an installation recovery list of the system to determine whether the list contains storage path information of the files having the characteristics of the root-privileged virus; and if so, call a preset path deleting command to delete the storage path information of the files having the characteristics of the root-privileged virus from the installation recovery list, or determine whether there is a file having the characteristics of the root-privileged virus in the executable files that are executed by default when the system is started, delete the file if there is such a file, and recover the original file corresponding to the deleted file.

Preferably, the file deleting submodule is configured to:

search the attribute information list of a file having the characteristics of the root-privileged virus for attribute information denoting that the file is undeletable, and delete the attribute information; and call a file deleting command to delete the file having the characteristics of the root-privileged virus.

Preferably, the apparatus further includes:

a root-privileged process terminating submodule configured to terminate the root-privileged removing process.

An electronic device is provided in an embodiment of the present application, including:

a processor, a memory, communication interfaces, and a bus;

the processor, the memory, and the communication interfaces are communicatively connected by the bus;

the memory is configured to store executable program code;

the processor is configured to read the executable program code stored on the memory to execute a program corresponding to the executable program code, in order to perform the following operations:

scanning the smart device to find a root-privileged virus file;

obtaining a root-privileged removing process according to the virus file; and removing the root-privileged virus file according to a preset removing strategy by using the root-privileged removing process.

For the purpose mentioned above, an application program is provided in an embodiment of the present application. The application program is configured to perform, when executed, the method for removing a root-privileged virus described above.

For the purpose mentioned above, a storage medium is provided in an embodiment of the present application. The storage medium is configured to store executable program instructions, which, when executed, perform the method for removing a root-privileged virus described above.

As can be seen from the solutions described above, embodiments of the present application provide a method and apparatus for removing a root-privileged virus and an electronic device. The method includes: scanning the smart device to find a root-privileged virus file; obtaining a root-privileged removing process according to the virus file; and using the root-privileged removing process to remove the root-privileged virus file according to a preset removing strategy. In the method for removing a root-privileged virus provided by embodiments of the present application, root privileges are obtained by using an approach that the root-privileged virus obtains root privileges. As a root-privileged process is directly obtained in the embodiments by using the root-privileged virus file, the smart device can obtain the root privileges more quickly, and the speed of killing the root-privileged virus is improved.

BRIEF DESCRIPTION OF THE DRAWINGS

To clearly illustrate the technical solutions of embodiments of the present application and the prior art, some accompanying drawings are provided as briefly described below. Obviously, these accompanying drawings are only for some embodiments of the present application, and those skilled in the art can obtain other drawings based on the accompanying drawings without any creative efforts.

DETAILED DESCRIPTION

To clarify the objectives, technical solutions, and advantages of the present application more comprehensible, the present application is described in detail below by illustrating embodiments with reference to the accompanying drawings. Obviously, the described embodiments described are merely some but not all of the embodiments of the present application. All other embodiments obtained by those skilled in the art based on the embodiments herein without any creative efforts are within the scope of the present application.

A detailed description of the present application is provided below with reference to specific embodiments.

Figure 1:
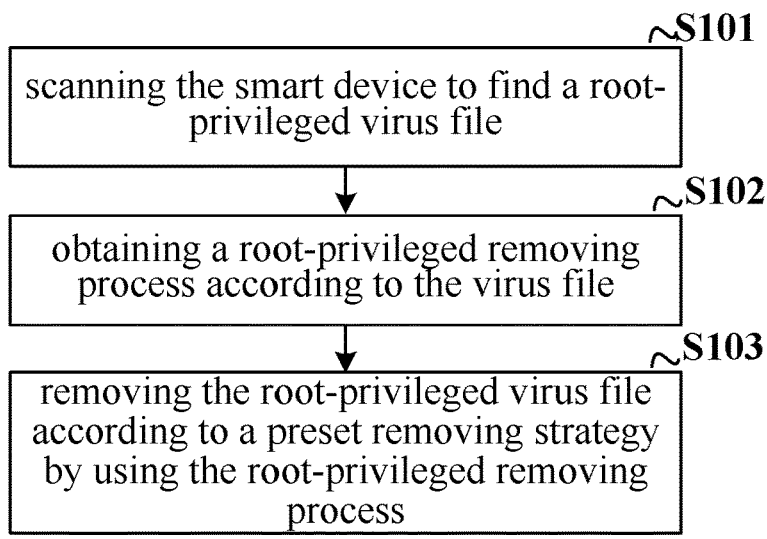
FIG. 1 is a schematic flowchart of the method for removing a root-privileged virus according to a first embodiment of the present application.

FIG. 1 is a schematic flowchart of the method for removing a root-privileged virus according to a first embodiment of the present application. The method can be applied to a smart device, and include the following steps:

S101, scanning the smart device to find a root-privileged virus file.

Storage path information of the root-privileged virus file may be recorded by the smart device. In fact, the storage path of a certain root-privileged virus file is the same in any smart device. In practice, the root-privileged virus file may be a virus file for the virus. As such, in this step, the storage path information of the root-privileged virus file may be obtained from a preset virus database. The root-privileged virus file in the smart device can then be found according to the obtained storage path information of the virus file. The storage path information can be obtained from a locally stored preset virus database, or otherwise downloaded from a server hosting a preset virus database.

S102, obtaining a root-privileged removing process according to the virus file.

In practice, there may be two types of such virus files. The first type is an executable file that records the approach to obtain the root privileges of the present smart device (the approach may be written in a script). The second type is an SU (Switch User) file generated by the root-privileged virus.

As a result, the step may be implemented in two manners.

In the case where the virus file is an executable file that records an approach to obtain root privileges, the virus file is executed. This may be equivalent to executing a pre-written script to repeat the steps by which the virus obtained the root privileges and thereby obtain an intrusion process. Following the approach that the root-privileged virus obtained the root privileges, the intrusion process triggers a corresponding system vulnerability, and set the process user identities GIU and UID of the intrusion process in the system kernel to zero by exploiting the system vulnerability. The process with a GIU and UID of zero is the root-privileged process in computer operation system.

In the case where the virus file is an SU file generated by the root-privileged virus, the SU file may be executed to obtain a root-privileged process.

In the prior art, any user who executes an SU file can get the privileges of the user who creates the SU file, because a process having the privileges of the user who creates the SU file will be generated upon execution of the SU file. The user executing the SU file can execute, by means of the process, the commands that could only be executed by the user who creates the SU file. In other words, the user executing the SU file get the right of the user who creates the SU file. The creation of a SU file and how it functions are known in the prior art and will be not described in the present application.

S103, removing the root-privileged virus file according to a preset removing strategy by using the root-privileged removing process.

A root-privileged process is directly obtained in this embodiment by using the approach that the root-privileged virus obtains the root privileges. As a result, the smart device can obtain the root privileges more quickly, improving the speed of killing the root-privileged virus.

After the removing process is obtained, in order to completely delete the root-privileged virus, the smart device may further determine all the files having the characteristics of the root-privileged virus, terminate the processes started by the files having the characteristics of the root-privileged virus, disable the auto start capability of the files having the characteristics of the root-privileged virus, and delete the files having the characteristics of the root-privileged virus. With respect to the method as shown in FIG. 1, the step S103 of removing the root-privileged virus file according to a preset removing strategy may include:

traversing the files in the smart device to determine all the files having the characteristics of the root-privileged virus according to the characteristics of the root-privileged virus stored in a preset database;

terminating processes started by the files having the characteristics of the root-privileged virus;

modifying startup items of the system to disable the auto start capability of the files having the characteristics of the root-privileged virus; and deleting the files having the characteristics of the root-privileged virus.

Figure 2:
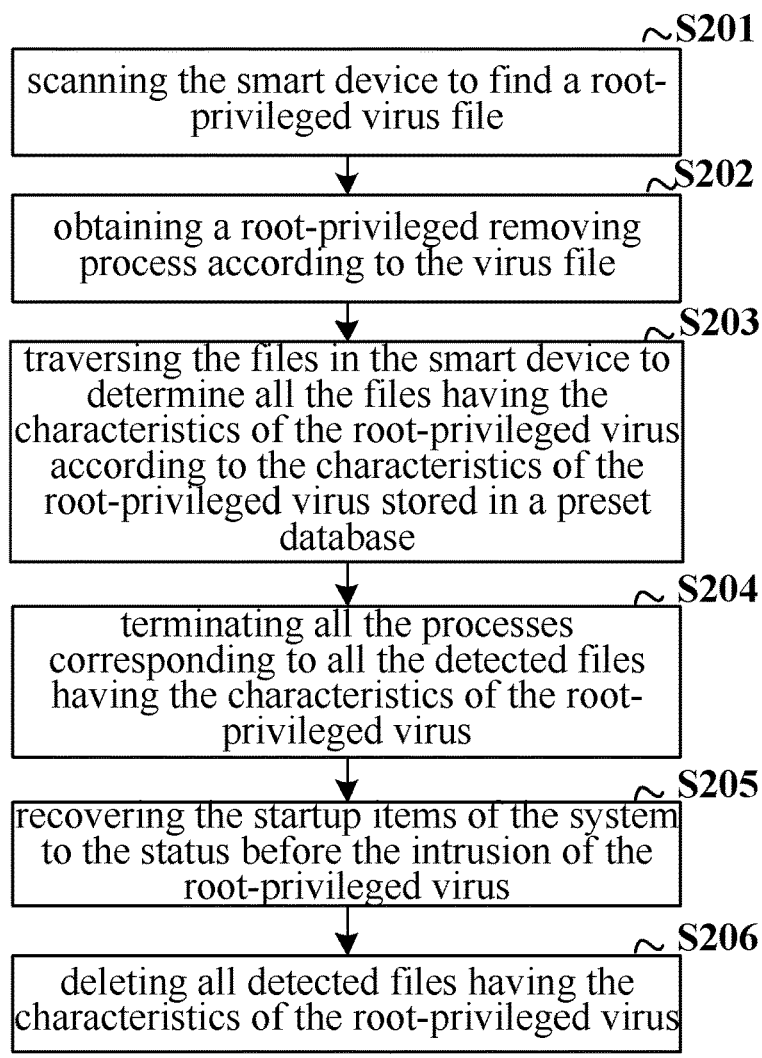
FIG. 2 is a schematic flowchart of the method for removing a root-privileged virus according to a second embodiment of the present application.

FIG. 2 is a schematic flowchart of the method for removing a root-privileged virus according to a second embodiment of the present application. The method may be applied to a smart device, and include the following steps:

S201, scanning the smart device to find a root-privileged virus file.

S202, obtaining a root-privileged removing process according to the virus file.

S203, traversing the files in the smart device to determine all the files having the characteristics of the root-privileged virus according to the characteristics of the root-privileged virus stored in a preset database.

Files in the smart device are traversed to determine all the files having the characteristics of the root-privileged virus according to the characteristics of the root-privileged virus stored in a preset database. For example, the name of a file released by a root-privileged virus has a specific suffix, and the specific suffix can be stored in the preset virus database as the characteristics of the virus. Accordingly, the smart device can traverse all files thereon, in order to determine files having the suffix as the files having the characteristics of the root-privileged virus.

S204, terminating all the processes corresponding to all the detected files having the characteristics of the root-privileged virus.

Process identity of each file having the characteristics of the root-privileged virus is determined based on the filenames of the file having the characteristics of the root-privileged virus.

A process terminating command may be called to terminate each process corresponding to the process identity.

For example, a process identity corresponding to a file having the characteristics of the root-privileged virus may be obtained by the command ps | grep filename. The process corresponding to each process identity can be terminated by calling a process terminating command. For example, the command kill −9 pid may be called to terminate the process corresponding to each process identity, wherein the process identity is pid.

S205, recovering the startup items of the system to the status before the intrusion of the root-privileged virus.

The smart device may determine the storage paths of all the files having the characteristics of the root-privileged virus, and then look up whether there is storage path information of the files having the characteristics of the root-privileged virus in an installation recovery list on the system, if so, a preset path deleting command is called to delete the storage path information of the files having the characteristics of the root-privileged virus from the installation recovery list.

The installation recovery list may be, as known in the art, a list that records startup items. Any executable file that has its address recorded in the installation recovery list will be automatically started when the system is rebooted. As such, the virus is prevented from starting automatically if the addresses of the files having the characteristics of the root-privileged virus are deleted from the list.

The smart device may determine whether there is a file having the characteristics of the root-privileged virus in the executable files that are executed by default when the system is started, delete the file (if any), and recover the original file corresponding to the deleted file.

Some executable files may be started by default each time the system is started. A file having the characteristics of a root-privileged virus may be disguised by the virus as an executable file that the system starts by default. For example, the file "debuggerd" under the path "/system/bin" is an executable file that the system will start by default every time it is started. A file having the characteristics of the root-privileged virus may be named as "debuggerd" and stored under the path "/system/bin" by the virus, while the original "debuggerd" file under the path is renamed as "debuggerd_xxx". When the system is started, the file named as "debuggerd" (i.e., the file having the characteristics of the root-privileged virus) under the path "/system/bin" will still be started by default. For a same virus, the rules for changing the name of an executable file that will be started by default are specific, for example, appending a suffix "_xxx" to the name of the executable file that will be started by default.

To cope with the auto start policy of the virus, the smart device can determine if there is a file having the characteristics of the root-privileged virus in the executable files that will be executed by default when the system is started, delete the file (if any), and recover the original file corresponding to the deleted file according to the rule that the virus changes the names of executable files started by default. As such, the way for the virus to start automatically as the system startup is precluded.

S206, deleting all detected files having the characteristics of the root-privileged virus.

The smart device searches the attribute list of a file having the characteristics of the root-privileged virus for attribute information denoting that the file is undeletable, and deletes the attribute information. A preset file-attribute-obtaining command can be called to obtain the attribute list of the file having the characteristics of the root-privileged virus. The smart device check, in the attribute list of the file, whether there is any attribute information that prevents the file to be deleted, if so, deletes the attribute information by calling a preset attribute-deleting command.

For example, the attribute information list of the file can be obtained by using the command "lsattr filename" on the file having the characteristics of the root-privileged virus. Each piece of attribute information of the attribute information list is examined to determine whether a field "-ia" is contained therein. If so, the file is considered to be undeletable. The command "chattr -ia filename" may then be called to delete the piece of attribute information such that the file having the characteristics of the root-privileged virus can be deleted.

The file having the characteristics of the root-privileged virus is deleted by calling a file-deleting command.

Once the attribute that prevent the file to be deleted is deleted from the file having the characteristics of the root-privileged virus, the file can be deleted with an existing file-deleting command. The directory containing the file having the characteristics of the root-privileged virus can also be deleted. For example, the file having the characteristics of the root-privileged virus can be deleted by using the command "rm filename [name of the file]", and the directory containing the file having the characteristics of the root-privileged virus can be deleted by using the command "rm -rf dir [directory containing the file]".

In this embodiment of the present application, the file having the characteristics of the root-privileged virus can be completely deleted, by terminating processes started by files having the characteristics of the root-privileged virus, disabling auto start capability of the files having the characteristics of the root-privileged virus, and deleting the files having the characteristics of the root-privileged virus.

As the root-privileged removing process may also be used by other programs to perform root-privileged operations, the smart device may be vulnerable to intrusion. To avoid this, the root-privileged removing process can be terminated after the root-privileged virus has been killed and removed. In addition to the steps as shown in FIG. 1, the method may further include:

terminating the root-privileged process.

Figure 3:
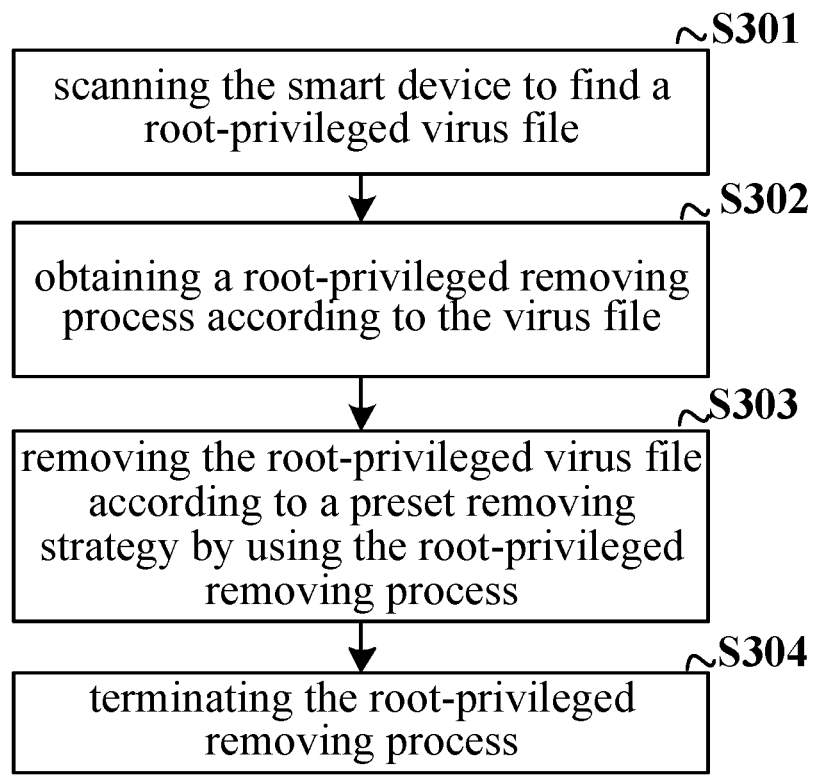
FIG. 3 is a schematic flowchart of the method for removing a root-privileged virus according to a third embodiment of the present application.

FIG. 3 is a schematic flowchart of the method for removing a root-privileged virus according to a third another embodiment of the present application. The method may be applied to a smart device, and include the following steps:

S301, scanning the smart device to find a root-privileged virus file.

S302, obtaining a root-privileged removing process according to the virus file.

S303, removing the root-privileged virus file according to a preset removing strategy by using the root-privileged removing process.

S304, terminating the root-privileged removing process.

Figure 4:
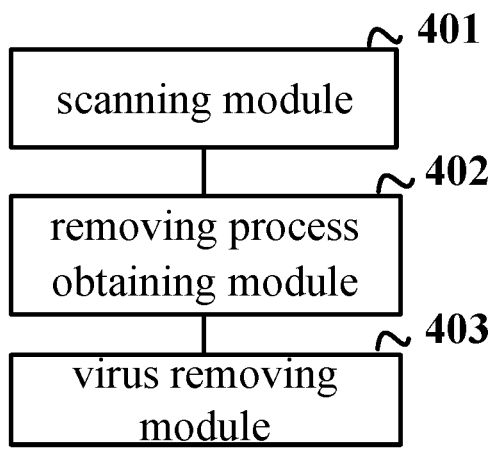
FIG. 4 is a schematic structure diagram of an apparatus for removing a root-privileged virus according to an embodiment of the present application.

FIG. 4 is a schematic structure diagram of an apparatus for removing root-privileged superuser according to an embodiment of the present application. The apparatus can be applied to a smart device, and include:

a scanning module 401, configured to scan the smart device to find a root-privileged virus file;

a removing process obtaining module 402, configured to obtain a root-privileged removing process according to the virus file; and a virus removing module 403, configured to remove the root-privileged virus file according to a preset removing strategy by using the root-privileged removing process.

Further, the scanning module 401 can include:

a path obtaining submodule (not shown) configured to obtain storage path information of the root-privileged virus file from a preset virus database; and a virus finding submodule (not shown) configured to find the root-privileged virus file in the smart device according to the obtained storage path information of the virus file.

Further, the removing process obtaining module 402 is further configured to:

execute, if the virus file is an executable file that records an approach of obtaining root privileges, the virus file to obtain the approach, and to obtain the root-privileged removing process according to the approach; and execute, if the virus file is a Switch Superuser file, the Switch Superuser file to obtain the root-privileged removing process.

Further, the removing process obtaining module 402 is further configured to:

execute the virus file to obtain an intrusion process, such that the intrusion process can automatically trigger a system vulnerability corresponding to the root-privileged virus, and set the process user identity of the intrusion process in the system kernel to zero by exploiting the system vulnerability to obtain the root-privileged removing process; or execute the virus file to create a root-privileged Switch Superuser process, such that a user using the smart device has the same root privileges as those of the root-privileged virus.

Further, the virus removing module 403 can include:

a virus determining submodule (not shown) configured to traverse the files in the smart device to determine all the files having the characteristics of the root-privileged virus according to the characteristics of the root-privileged virus stored in a preset database;

a process terminating submodule (not shown) configured to terminate all the processes corresponding to all the detected files having the characteristics of the root-privileged virus;

a startup items recovery submodule (not shown) configured to recover the startup items of the system to the status before the intrusion of the root-privileged virus; and a file deleting submodule (not shown) configured to delete all the detected files having the characteristics of the root-privileged virus.

Further, the process terminating submodule is further configured to:

determine a process identity corresponding to each of the determined files having the characteristics of the root-privileged virus based on the filename of the file having the characteristics of the root-privileged virus; and call a process terminating command to terminate the process corresponding to the process identity.

Further, the startup item recovery submodule is further configured to:

determine storage paths of all the files having the characteristics of the root-privileged virus; search an installation recovery list of the system to determine whether the list contains storage path information of the files having the characteristics of the root-privileged virus; and if so, call a preset path deleting command to delete the storage path information of the files having the characteristics of the root-privileged virus from the installation recovery list, or determine whether there is a file having the characteristics of the root-privileged virus in the executable files that are executed by default when the system is started, delete the file if there is such a file, and recover the original file corresponding to the deleted file.

Further, the file deleting submodule is configured to:

search the attribute information list of a file having the characteristics of the root-privileged virus for attribute information denoting that the file is undeletable, and delete the attribute information; and call a file deleting command to delete the file having the characteristics of the root-privileged virus.

Further, the apparatus may also include:

a root-privileged process terminating submodule configured to terminate the root-privileged removing process.

A method and an apparatus, applicable to a smart device, for removing a root-privileged virus are provided by embodiments of the present application. The apparatus is configured to scan the smart device to find a root-privileged virus file; obtain a root-privileged removing process according to the virus file; and use the root-privileged removing process to remove the root-privileged virus file according to a preset removing strategy. In the embodiments of the present application, the root privileges are obtained by using the approach that a root-privileged virus obtains the root privileges. As a root-privileged process is directly obtained in this embodiment by using the root-privileged virus file, the smart device can obtain the root privileges more quickly, improving the speed of killing the root-privileged virus.

Figure 5:
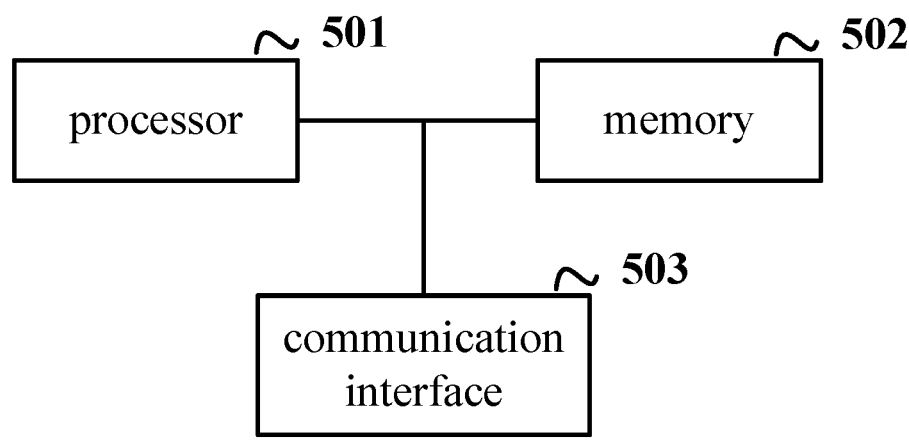
FIG. 5 is a schematic structure diagram of an electronic device according to an embodiment of the present application.

FIG. 5 is a schematic view of an electronic device according to an embodiment of the present application. The electronic device includes:

a processor 501, a memory 502, communication interfaces 503, and a bus; wherein the processor 501, the memory 502, and the communication interfaces 503 are communicatively connected by the bus;

the memory 502 is configured to store executable program code;

the processor 501 is configured to read the executable program code stored on the memory 502 to execute a program corresponding to the executable program code, in order to perform the following operations:

scanning the smart device to find a root-privileged virus file;

obtaining a root-privileged removing process according to the virus file; and removing the root-privileged virus file according to a preset removing strategy by using the root-privileged removing process.

In the embodiment as shown in FIG. 5 of the present application, the root privileges are obtain by using an approach that a root-privileged virus obtains root privileges. As a root-privileged process is directly obtained in this embodiment by using the root-privileged virus file, the smart device can obtain the root privileges more quickly, improving the speed of killing the root-privileged virus.

Embodiments of the present application further provide an application program configured to perform, when executed, the method for removing a root-privileged virus. The method includes:

scanning the smart device to find a root-privileged virus file;

obtaining a root-privileged removing process according to the virus file; and removing the root-privileged virus file according to a preset removing strategy by using the root-privileged removing process.

In this embodiment, the root privileges are obtained by using an approach that a root-privileged virus obtains root privileges. As a root-privileged process is directly obtained in this embodiment by using the root-privileged virus file, the smart device can obtain the root privileges more quickly, improving the speed of killing the root-privileged virus.

Embodiments of the present application further provide a storage medium configured to store an application program, the application program is configured to perform, when executed, the method for removing a root-privileged virus. The method includes:

scanning the smart device to find a root-privileged virus file;

obtaining a root-privileged removing process according to the virus file; and removing the root-privileged virus file according to a preset removing strategy by using the root-privileged removing process.

In this embodiment, the root privileges are obtained by using an approach that a root-privileged virus obtains root privileges. As a root-privileged process is directly obtained in this embodiment by using the root-privileged virus file, the smart device may obtain the root privileges more quickly, and the root-privileged virus can be killed much sooner.

A relative simple description is provided to the embodiments of system, apparatus, and device in view of their resemblance with the method embodiments. Relevant details of such embodiments can be obtained with reference to the description of the method embodiments.

It should be noted that in the claims and the specification, relationship terms such as "first", "second" and the like are only used to distinguish one entity or operation from another entity or operation, and do not necessarily require or imply that there is any such actual relationship or order between those entities or operations. Moreover, the terms "comprise," "include" or any other variants are intended to cover a non-exclusive inclusion, such that processes, methods, objects or devices including a series of elements include not only those elements, but also other elements not specified or the elements inherent to those processes, methods, objects or devices. Without further limitations, elements limited by the phrase "include(s) a . . . " do not exclude that there are other identical elements in the processes, methods, objects or devices that include that element.

It could be understood by those with ordinary skills in the art that all or a part of the processes of the methods described above can be implemented by a computer program instructing related hardware, and the program can be stored on a computer-readable storage medium, such as a magnetic disk, an optical disk, a Read-Only Memory (ROM), or Random Access Memory (RAM).

What has been described above are merely preferred embodiments of the present application, and are not used to limit the present application. Any modification, equivalent replacement or improvement made within the spirit and principle of the present application are within the scope of protection of the present application.

What is claimed is:

1. A method for removing a root-privileged virus, applicable to a smart device, comprising:
    scanning the smart device to find a root-privileged virus file;
    obtaining a root-privileged removing process according to the virus file, comprising:
        if the root-privileged virus file is an executable file that records an approach of obtaining root privileges, executing the root-privileged virus file to obtain the approach and obtaining the root-privileged removing process according to the approach; and
        if the root-privileged virus file is a Switch Superuser file, executing the Switch Superuser file to obtain the root-privileged removing process; and
    removing the root-privileged virus file according to a preset removing strategy by using the root-privileged removing process.

2. The method of claim 1, wherein scanning the smart device to find a root-privileged virus file comprises:
    obtaining storage path information of the root-privileged virus file from a preset virus database; and
    finding the root-privileged virus file in the smart device according to the obtained storage path information of the root-privileged virus file.

3. The method of claim 1, wherein executing the root-privileged virus file to obtain the approach and obtaining the root-privileged removing process according to the approach comprises:
    executing the root-privileged virus file to obtain an intrusion process, such that the intrusion process can automatically trigger a system vulnerability corresponding to the root-privileged virus, and setting a process user identity of the intrusion process in a system kernel to zero by exploiting the system vulnerability to obtain the root-privileged removing process; and
    wherein executing the Switch Superuser file to obtain the root-privileged removing process comprises:
    executing the root-privileged virus file to create a root-privileged Switch Superuser process, such that a user using the smart device has the same root privileges as those of the root-privileged virus.

4. The method of claim 1, wherein removing the root-privileged virus file according to the preset removing strategy comprises:
    traversing files in the smart device to determine all files having characteristics of the root-privileged virus according to the characteristics of the root-privileged virus stored in a preset database;

terminating all processes corresponding to all the determined files having the characteristics of the root-privileged virus;

recovering startup items of an operating system of the smart device to status before an intrusion of the root-privileged virus; and deleting all the determined files having the characteristics of the root-privileged virus.

5. The method of claim 4, wherein terminating all the processes corresponding to all the determined files having the characteristics of the root-privileged virus comprises:

determining a process identity corresponding to each of the determined files having the characteristics of the root-privileged virus based on a filename of the file having the characteristics of the root-privileged virus; and calling a process terminating command to terminate a process corresponding to the process identity.

6. The method of claim 4, wherein recovering startup items of the operating system of the smart device to the status before the intrusion of the root-privileged virus comprises:

determining storage paths of all the files having the characteristics of the root-privileged virus; searching an installation recovery list of the operating system to determine whether the installation recovery list contains storage path information of the files having the characteristics of the root-privileged virus; and if so, calling a preset path deleting command to delete the storage path information of the files having the characteristics of the root-privileged virus from the installation recovery list, or determining whether there is a file having the characteristics of the root-privileged virus in executable files that are executed by default when the operating system is started, if there is such a file, deleting the file, and recovering an original file corresponding to the deleted file.

7. The method of claim 4, wherein deleting all the determined files having the characteristics of the root-privileged virus comprises:

searching an attribute information list of a file having the characteristics of the root-privileged virus for attribute information denoting that the file is undeletable, and deleting the attribute information; and calling a file deleting command to delete the file having the characteristics of the root-privileged virus.

8. The method of claim 1, further comprising:

terminating the root-privileged removing process.

9. An electronic device, comprising:

a processor, a memory, communication interfaces, and a bus; wherein the processor, the memory, and the communication interfaces are communicatively connected by the bus;

the memory stores executable program codes thereon; and the processor is configured to read the executable program codes stored on the memory to execute a program corresponding to the executable program codes, in order to perform operations comprising:

scanning a smart device to find a root-privileged virus file;

obtaining a root-privileged removing process according to the virus file, comprising:

if the root-privileged virus file is an executable file that records an approach of obtaining root privileges, executing the root-privileged virus file to obtain the approach and obtaining the root-privileged removing process according to the approach; and if the root-privileged virus file is a Switch Superuser file, executing the Switch Superuser file to obtain the root-privileged removing process; and removing the root-privileged virus file according to a preset removing strategy by using the root-privileged removing process.

10. The electronic device of claim 9, wherein the operations further comprise:

obtaining storage path information of the root-privileged virus file from a preset virus database; and finding the root-privileged virus file in the smart device according to the obtained storage path information of the root-privileged virus file.

11. The electronic device of claim 9, wherein the operations further comprise:

executing the root-privileged virus file to obtain an intrusion process, such that the intrusion process can automatically trigger a system vulnerability corresponding to the root-privileged virus, and setting a process user identity of the intrusion process in a system kernel to zero by exploiting the system vulnerability to obtain the root- privileged removing process; or executing the root-privileged virus file to create a root-privileged Switch Superuser process, such that a user using the smart device has the same root privileges as those of the root-privileged virus.

12. The electronic device of claim 9, wherein the operations further comprise:

traversing files in the smart device to determine all files having characteristics of the root-privileged virus according to the characteristics of the root-privileged virus stored in a preset database;

terminating all processes corresponding to all the determined files having the characteristics of the root-privileged virus;

recovering startup items of an operating system of the smart device to status before an intrusion of the root-privileged virus; and deleting all the determined files having the characteristics of the root-privileged virus.

13. The electronic device of claim 12, wherein the operations further comprise:

determining a process identity corresponding to each of the determined files having the characteristics of the root-privileged virus based on a filename of the file having the characteristics of the root-privileged virus; and calling a process terminating command to terminate a process corresponding to the process identity.

14. The electronic device of claim 12, wherein the operations further comprise:

determining storage paths of all the files having the characteristics of the root-privileged virus; searching an installation recovery list of the operating system to determine whether the installation recovery list contains storage path information of the files having the characteristics of the root-privileged virus; and if so, calling a preset path deleting command to delete the storage path information of the files having the characteristics of the root-privileged virus from the installation recovery list, or determining whether there is a file having the characteristics of the root-privileged virus in executable files that are executed by default when the operating system is started, if there is such a file, deleting the file, and recovering an original file corresponding to the deleted file.

15. The electronic device of claim 12, wherein the operations further comprise:
searching an attribute information list of a file having the characteristics of the root-privileged virus for attribute information denoting that the file is undeletable, and deleting the attribute information; and
calling a file deleting command to delete the file having the characteristics of the root-privileged virus.

16. The electronic device of claim 9, wherein the operations further comprise: terminating the root-privileged removing process.

17. A non-transitory storage medium comprising executable instructions that, when executed, cause an apparatus comprising a processor to perform operations for removing a root-privileged virus, the operations comprising:
scanning a smart device to find a root-privileged virus file;
obtaining a root-privileged removing process according to the virus file, comprising:
if the root-privileged virus file is an executable file that records an approach of obtaining root privileges, executing the root-privileged virus file to obtain the approach and obtaining the root-privileged removing process according to the approach; and
if the root-privileged virus file is a Switch Superuser file, executing the Switch Superuser file to obtain the root-privileged removing process; and
removing the root-privileged virus file according to a preset removing strategy by using the root-privileged removing process.

* * * * *